(12) United States Patent
Wu

(10) Patent No.: US 9,791,624 B2
(45) Date of Patent: Oct. 17, 2017

(54) METHODS FOR STRIPPING AN OPTICAL FIBER COATING USING BLUE OR BLUE-VIOLET RADIATION

(71) Applicant: CORNING OPTICAL COMMUNICATIONS LLC, Hickory, NC (US)

(72) Inventor: Qi Wu, Painted Post, NY (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 479 days.

(21) Appl. No.: 14/563,117

(22) Filed: Dec. 8, 2014

(65) Prior Publication Data

US 2016/0131839 A1    May 12, 2016

Related U.S. Application Data

(60) Provisional application No. 62/076,503, filed on Nov. 7, 2014.

(51) Int. Cl.
*G02B 6/245* (2006.01)
*B23K 26/36* (2014.01)
*B23K 26/402* (2014.01)

(52) U.S. Cl.
CPC ............. *G02B 6/245* (2013.01); *B23K 26/36* (2013.01); *B23K 26/402* (2013.01)

(58) Field of Classification Search
None
See application file for complete search history.

(56) References Cited

U.S. PATENT DOCUMENTS

| 5,101,090 | A  | 3/1992  | Coyle, Jr. et al. |
| 6,509,547 | B1 | 1/2003  | Bernstein et al.  |
| 6,957,000 | B2 | 10/2005 | McAlpine et al.   |

(Continued)

FOREIGN PATENT DOCUMENTS

| EP | 1228834 A1 | 8/2002 | |
| FR | WO 2014001716 A1 * | 1/2014 | ............. H02G 1/128 |

(Continued)

OTHER PUBLICATIONS

Rizvi, "Excimer lasers machine novel microstructures", Laser Focus World, Nov. 2000, 5 pages.*

(Continued)

*Primary Examiner* — Lisa Herring
(74) *Attorney, Agent, or Firm* — Adam R. Weeks

(57) ABSTRACT

Methods for stripping an optical fiber coating using blue or blue-violet radiation are disclosed. The method includes irradiating a portion of the coating with at least one radiation beam having a processing wavelength in the range of 400 nm to 460 nm for which the coating is substantially transparent. The intensity of the radiation beam exceeds the optical-damage threshold of the coating, and thereby a damaged coating portion that absorbs radiation at the processing wavelength is formed. The damaged coating portion is then irradiated with the radiation beam having an intensity below the optical-damage threshold to cause the damaged coating portion to absorb the radiation and to subsequently heat up and disintegrate to expose a section of the central glass portion of the optical fiber.

24 Claims, 8 Drawing Sheets

(56) References Cited

U.S. PATENT DOCUMENTS

| | | |
|---|---|---|
| 7,123,802 B2 | 10/2006 | Engberg et al. |
| 8,052,836 B2 | 11/2011 | Cale et al. |
| 8,755,654 B1 | 6/2014 | Danley et al. |
| 2006/0089455 A1 | 4/2006 | Sterin et al. |
| 2010/0126665 A1 | 5/2010 | Cale et al. |
| 2012/0135177 A1 | 5/2012 | Cornejo et al. |
| 2013/0270234 A1 | 10/2013 | Thomas et al. |
| 2015/0162729 A1* | 6/2015 | Reversat ............... H02G 1/128 219/121.73 |

FOREIGN PATENT DOCUMENTS

| | | | |
|---|---|---|---|
| WO | 03082890 | A1 | 10/2003 |
| WO | 03092890 | | 11/2003 |
| WO | 03092890 | A2 | 11/2003 |

OTHER PUBLICATIONS

Villafranca et al., "Polarization dependent femtosecond laser ablation of PMMA—role of light-plasma interaction", CLEO 2012 Conference, Oct. 2012, 2 pages.*

International Search Report and Written Opinion of the International Searching Authority; PCT/US2015/058058; dated Apr. 22, 2016.

Maezono et al; "Damage Threshold of Acrylic Polymer Jackets Surrounded With Optical Fiber by UV Laser," Proc. SPIE vol. 6346, XVI, International Symposium on Gas Flow, Chemical Lasers, and High-Power Lasers, (2007).

Manenkov et al; "Mechanism of the Accumulation Effect in Laser Damage Due to Polymers: Appearance of Microdamage Due to an Ionization Absorption Wave"; Soviet Journal of Quantum Electronics, American Institute of Physics, New York, NY; vol. 14, No. 4, Apr. 1, 1984.

Manenkov et al; "Role of Absorbing Defects in Laser Damage to Transparent Polymers"; Soviet Journal of Quantum Electronics; vol. 10, No. 3, Mar. 31, 1980.

Ogura et al; "Laser Stripping of Optical Fibers Opens Up New Applications," Laser Focus World, vol. 37, N. 6, p. 169-171 (2001).

Snelling et al; "Polymer Jacket Stripping of Optical Fibres by Laser Irradiation", Appl. PHYS. A, V 79, N. 4-6, p. 937-940, (2004).

Zyung et al; "Ultrafast Imaging of 0.532-[Mu]M Lasaer Ablation of Polymers: Time Evolution of Surface Damage and Blast Wave Generation"; Journal of Applied Physics; vol. 65, No. 12, Jan. 1, 1989.

Optek—Laser Strip, webpage. Retrieved on May 14, 2016. http://www.opteksystems.com/production-equipment/fiber-processing-machine-tools/laser-strip/.

* cited by examiner

METHODS FOR STRIPPING AN OPTICAL FIBER COATING USING BLUE OR BLUE-VIOLET RADIATION

PRIORITY APPLICATION

This application claims the benefit of priority under 35 U.S.C. §119 of U.S. Provisional Application Ser. No. 62/076,503, filed on Nov. 7, 2014, the content of which is relied upon and incorporated herein by reference in its entirety.

FIELD

The present disclosure relates to optical fibers, and in particular to methods for stripping the coating of an optical fiber using a blue or blue-violet radiation.

BACKGROUND

Optical fibers are a type of optical waveguide that include a core, a cladding that surrounds the core, and a protective coating that surrounds the cladding. The protective coating is typically made of a polymer (e.g., a UV-cured acrylate), while the core and cladding are typically made of glass.

Optical fibers are used in a variety of applications that require terminating an end of the fiber, e.g., with an optical fiber connector. This requires among other things stripping away a portion of the protective coating to leave a bare portion of the optical fiber.

One method of stripping the coating from an optical fiber uses a tool that mechanically contacts the optical fiber. While mechanical stripping tools can be made compact for field deployment and can be low cost, they tend to damage and weaken the resulting bare fiber section.

To avoid such damage, non-contact stripping techniques have been developed. These include hot-nitrogen-jet, plasma, and laser-based techniques. Laser-based stripping techniques have the advantage of providing precise coating removal without mechanical damage. One type of laser-based stripping is performed using a $CO_2$ laser, wherein the coating absorbs the infrared wavelength of the $CO_2$ laser beam. The absorption causes the coating to heat up and then disintegrate. Unfortunately, the equipment for laser-based stripping tools has to date not been amenable to field deployment because of limitations in cost, size, weight and power consumption.

SUMMARY

An aspect of the disclosure is a method of stripping a coating from an optical fiber, wherein the coating has an optical-damage threshold and surrounds a central glass portion of the optical fiber. The method includes: a) irradiating a portion of the coating with at least one beam of radiation having a wavelength at which the coating is substantially transparent and an intensity that exceeds the optical-damage threshold of the coating to form a damaged coating portion that absorbs radiation at the wavelength of the at least one beam of radiation; and b) irradiating the damaged coating portion with the at least one beam of radiation to cause the damaged coating to absorb a portion of the radiation and to subsequently heat up and disintegrate to expose a section of the central glass portion.

Another aspect of the disclosure is a method of processing an optical fiber having a central glass portion defined by a core and a cladding and having a coating surrounding the glass portion that is substantially transparent to a processing wavelength and that has an optical-damage threshold intensity at the processing wavelength. The method includes: a) irradiating a portion of the coating with at least one first radiation beam having the processing wavelength, wherein the processing wavelength is either 405 nm or 445 nm, and having an intensity greater than the optical-damage threshold intensity to create a damaged coating portion; and b) irradiating the damaged coating portion with at least one second radiation beam having the processing wavelength of either 405 nm or 445 nm and an intensity that is less than the optical-damage threshold intensity.

Another aspect of the disclosure is the method as described above, including forming the at least one second radiation beam from the at least one first radiation beam by defocusing the at least one first radiation beam.

Another aspect of the disclosure is a method of processing an optical fiber. The method includes: a) movably holding the optical fiber, wherein the optical fiber has a central glass portion defined by a core and a cladding and has a coating surrounding the glass portion and having a diameter, the coating being substantially transparent to a processing wavelength and having an optical-damage threshold intensity at the processing wavelength; b) forming at least one first focused radiation beam having the processing wavelength and having a depth of focus, a spot size that is less than the diameter of the coating within the depth of focus, and an intensity greater than the optical-damage threshold intensity within at least a portion of the depth of focus; c) arranging the optical fiber within the depth of focus and irradiating a portion of the coating with the at least one focused radiation beam to create a damaged coating portion; d) defocusing the at least one focused radiation beam to define at least one defocused radiation beam having an intensity that is less than the optical-damage threshold intensity; and e) irradiating the damaged coating portion with the at least one defocused radiation beam that irradiates the entire diameter of the coating.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate various embodiments and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

Cartesian coordinates are shown in some of the Figures for the sake of reference and are not intended to be limiting as to direction or orientation.

Figure 1:
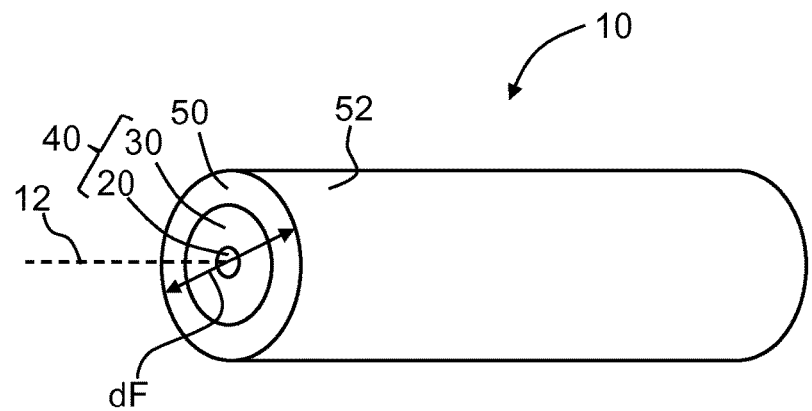
FIG. 1 is a front elevated view of an example optical fiber to be processed using the systems and methods disclosed herein, illustrating the arrangement of the core, cladding and coating.

FIG. 1 is a front elevated view of an example optical fiber 10 to be processed using the systems and methods disclosed herein. The optical fiber 10 has a centerline 12, a core region ("core") 20 arranged along the centerline, an annular cladding region ("cladding") 30 that surrounds the core, and an annular coating 50 that surrounds the cladding and defines an outer surface 52 of the optical fiber. The core 20 and cladding 30 are typically made of glass while coating 50 is typically made of a polymer, such as acrylate. In an example, coating 50 is generally transparent to visible radiation, down to wavelengths of about 200 nm. The coating 50 has an optical-damage threshold, which is also referred to herein as an optical-damage threshold intensity since the optical-damage threshold can be measured in units of intensity (i.e., optical power per unit area).

The optical fiber 10 has a diameter dF that is a measure of the outside diameter of coating 50. The diameter dF may be, for example, nominally 250 μm, or 0.25 mm. The optical fiber 10 can have any reasonable diameter dF consistent with single-mode or multimode operation.

The core 20 and cladding 30 define a central glass portion 40 of optical fiber 10, with coating 50 surrounding the central glass portion. The central glass portion 40 without coating 50 is referred to herein as a "bare section" or "stripped section" 42 of optical fiber 10 (see, e.g., FIG. 5).

Figure 2A:
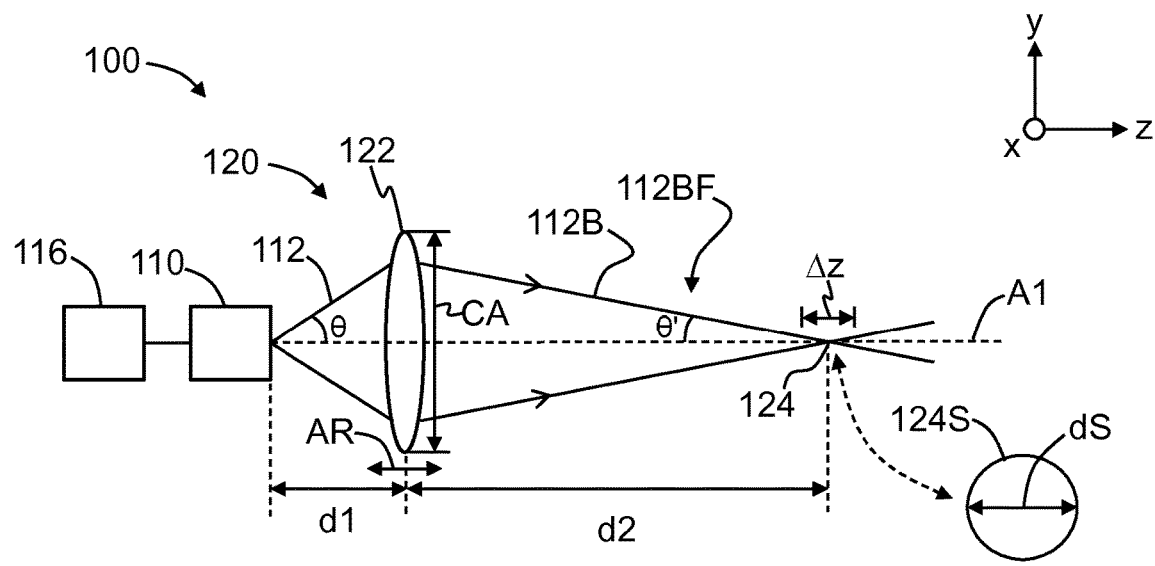
FIG. 2A is a schematic diagram of an example optical system used to carry out the non-contact stripping methods for stripping a portion of the coating disclosed herein.

FIG. 2A is a schematic diagram of an example optical system 100 used to carry out the non-contact stripping methods disclosed herein. The optical system 100 has an optical axis A1, which runs in the z-direction. The optical system 100 includes a radiation source 110 along optical axis A1 that emits radiation 112 at a divergence angle θ measured relative to the optical axis. The radiation 112 has a wavelength λ, which is referred to herein as the "processing wavelength." In an example, processing wavelength λ is in the wavelength range from 380 nm to 490 nm and in another example is in the wavelength range from 400 nm to 460 nm.

In another example, the processing wavelength λ is in the range from 300 nm to 1100 nm. In an example, radiation source 110 comprises a diode laser that emits radiation 112 at a processing wavelength within the 300 nm to 1100 nm range.

In an example, coating 50 is substantially transparent to radiation 112 having processing wavelength λ. Here, the term "substantially transparent" with respect to coating 50 and processing wavelength λ means that the amount of absorption in the coating at the processing wavelength is not sufficient to heat the (undamaged) coating to the point where the coating is removed from central glass portion 40.

In an example, radiation source 110 includes or consists of a 405-nm blue-violet diode laser (i.e., λ=405 nm), which is widely used in Blu-ray Disc™ players. Such diode lasers operate in single mode and thus emit a Gaussian beam having excellent beam quality. Another example radiation source 110 includes or consists of a blue diode laser that emits radiation at a nominal processing wavelength λ=445 nm. In an example, radiation source 110 is operably attached to a portable power supply 116, which in an example is or includes one or more batteries.

Generally speaking, radiation source 110 can be any radiation source that emits radiation 112 at a nominal processing wavelength λ of either 405 nm or 445 nm, and that provides sufficient optical power to carry out the optical fiber stripping methods disclosed herein while allowing optical system 100 to be sufficiently compact to be readily deployed and used in the field.

The optical system 100 also includes a focusing optical system 120 arranged along optical axis A1 optically downstream from radiation source 110. The focusing optical system 120 includes one or more optical elements 122 configured to receive radiation 112 from radiation source 110 and form therefrom a radiation beam 112B. In an example, radiation beam 112B has a focus position 124 along axis A1 and an associated convergence angle θ' measured relative to optical axis A1. The one or more optical elements 122 can include lenses, mirrors, apertures, gratings, fibers, beamsplitters, filters, attenuators, polarizers, etc. In an example, the one or more optical elements 122 consist of a single refractive element, such as an aspheric lens element or aspheric mirror element. In an example, the single refractive element includes an antireflection coating. An example material for a single aspheric refractive element is ECO-550 glass, which can be molded into a suitable aspheric shape. In an example, at least one of the one or more optical elements 122 of focusing optical system 120 is movable (e.g., axially movable, as indicated by arrow AR) to adjust focus position 124 and convergence angle θ'.

The optical system 100 of FIG. 2A shows a single optical element 122 by way of example, wherein the single optical element resides a distance d1 away from radiation source 110 and a distance d2 from focus position 124. The radiation beam 112B constitutes a focused radiation beam 112BF that forms a focus spot 124S in the x-y plane at focus position 124, the focus spot having a diameter dS at focus position 124. In an example, diameter dS of focus spot 124S is in the range from 5 µm to 20 µm. In an example, focus spot 124S resides within a depth of focus Δz associated with focused radiation beam 112BF, where focus position 124 is at the center of the depth of focus. The diameter dS of focus spot 124S can be well approximated by the size of the aberration-free airy disk, i.e., $dS \approx 1.22\lambda/NA$, where NA is the numerical aperture and is given by $NA = n \cdot \sin \theta'$, where $n=1$ for air in most instances. For a diameter dS of 20 µm and a processing wavelength $\lambda = 405$ nm, the numerical aperture $NA \approx 0.025$. The clear aperture CA is the diameter of focusing optical system 120 (e.g., of optical element 122) and in an example is in the range 2 mm ≤ CA ≤ 12 mm.

Figure 2B:
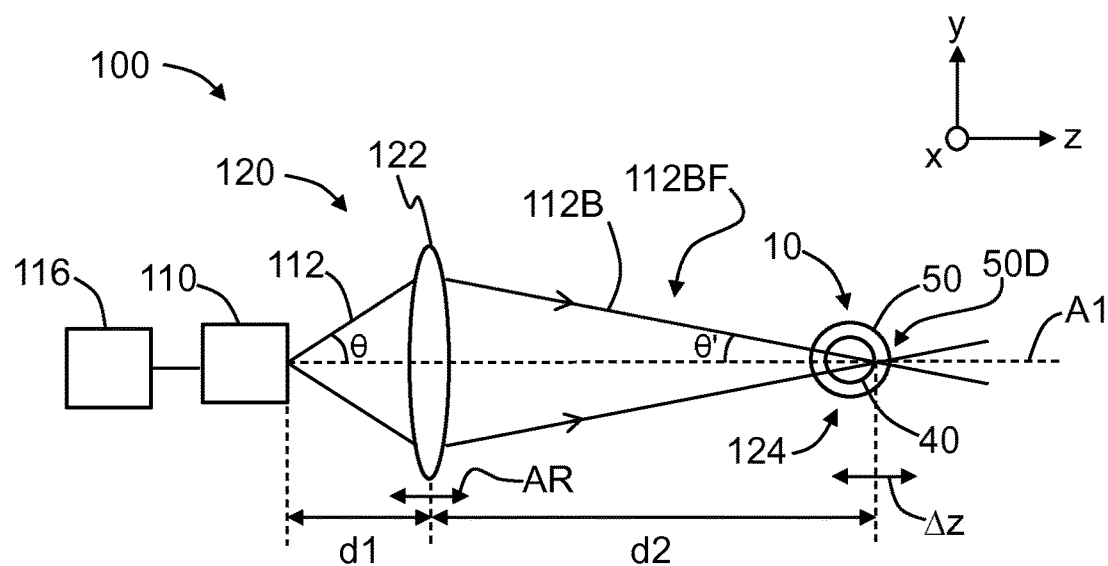
FIG. 2B is similar to FIG. 2A and further includes the optical fiber being processed while the optical system is in a focused configuration.
Figure 3:
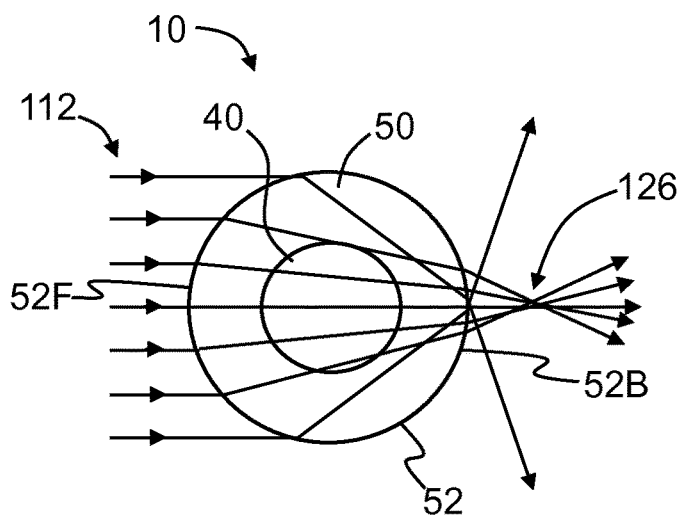
FIG. 3 is a close-up cross-sectional view of the optical fiber illustrating how collimated radiation is concentrated within the coating layer and brought to a loose focus just beyond the back side of the outer surface of the coating.

FIG. 2B is similar to FIG. 2A, and includes optical fiber 10 arranged substantially at focus position 124 (e.g., within the depth of focus Δz), with centerline 12 of the optical fiber arranged along the x-direction. Because optical fiber 10 has a relatively small diameter (e.g., 250 microns or 0.25 mm), the optical fiber acts as a strong cylindrical lens. FIG. 3 is a close-up cross-sectional view of optical fiber 10 showing collimated radiation rays 112 (or "radiation beam 112" or simply "radiation 112") incident upon the optical fiber on a front side 52F of outer surface 52. The radiation rays 112 are focused by the curved outer surface 52 and are concentrated within coating 50 and brought to a loose focus 126 just beyond a back side 52B of the outer surface.

For a convergent or focused radiation beam 112BF such as is shown in FIG. 2B, radiation rays 112 are even more concentrated, and loose focus 126 can be formed within coating 50. The greater the concentration of radiation rays 112, the greater the intensity of radiation. In an example, the radiation intensity in radiation beam 112B at back side 52B of optical fiber 10 is about three times greater than that at front side 52F. In an example, the intensity of focused radiation beam 112BF over at least a portion of the depth of focus Δz exceeds the optical-damage threshold intensity for coating 50.

Figure 2C:
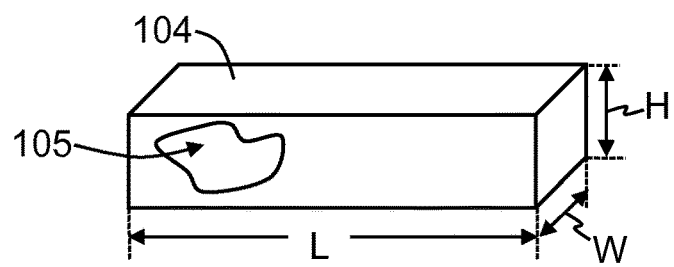
FIG. 2C shows an example housing for the optical system and shows length, width and height dimensions, which in an example are selected such that the optical system is compact, e.g., small enough to be handheld.

In an example illustrated in FIG. 2C, optical system 100 is contained within an interior 105 of a housing 104. In an example, housing 104 is sized to be compact, e.g., small enough to be handheld. The housing 104 is shown by way of example as being generally rectangular and having a length L, a width W, a height H and a volume V=L×W×H. Example dimensions for housing 104 are 50 mm ≤ L ≤ 150 mm; 30 mm ≤ W ≤ 75 mm; and 12 mm ≤ H ≤ 25 mm. An example range of the volume V of housing 104 is 15 cm³ ≤ V ≤ 60 cm³.

A blue-violet diode laser has an output power of about 700 mW and an operating wavelength of $\lambda = 405$ nm. It is noted here that coating 50 is transparent to this wavelength of radiation. However, as discussed above, coating 50 has an optical-damage threshold (which can be expressed in units of optical intensity) that is typically no greater than about 2 MW/cm² at 405 nm or 455 nm. An intensity that exceeds this damage threshold can be generated by optical system 100 by making the focus spot diameter dS (see FIG. 1) about 20 microns. Moreover, nonlinear effects in coating 50 can increase the absorption and raise the temperature of the coating, and reduce the optical-damage threshold intensity of the coating.

Thus, with continuing reference to FIG. 2B, radiation beam 112B is formed as a focused radiation beam 112BF such that radiation 112 that irradiates coating 50 of optical fiber 10 has an intensity that exceeds the optical-damage threshold of the coating. This results in localized damage of coating 50, i.e., a damaged coating portion 50D. The configuration of optical system 100 shown in FIG. 2B wherein radiation beam 112B forms a focused radiation beam 112BF having the focus position 124, which is within or very close to coating 50 is referred to as the "focused configuration." In an example, the focused configuration is defined by optical fiber 10 being within the depth of focus Δz, with focused radiation beam 112BF having an intensity that exceeds the optical-damage threshold of coating 50 over at least a portion of the depth of focus, and in one example over the entire depth of focus.

Figure 4:
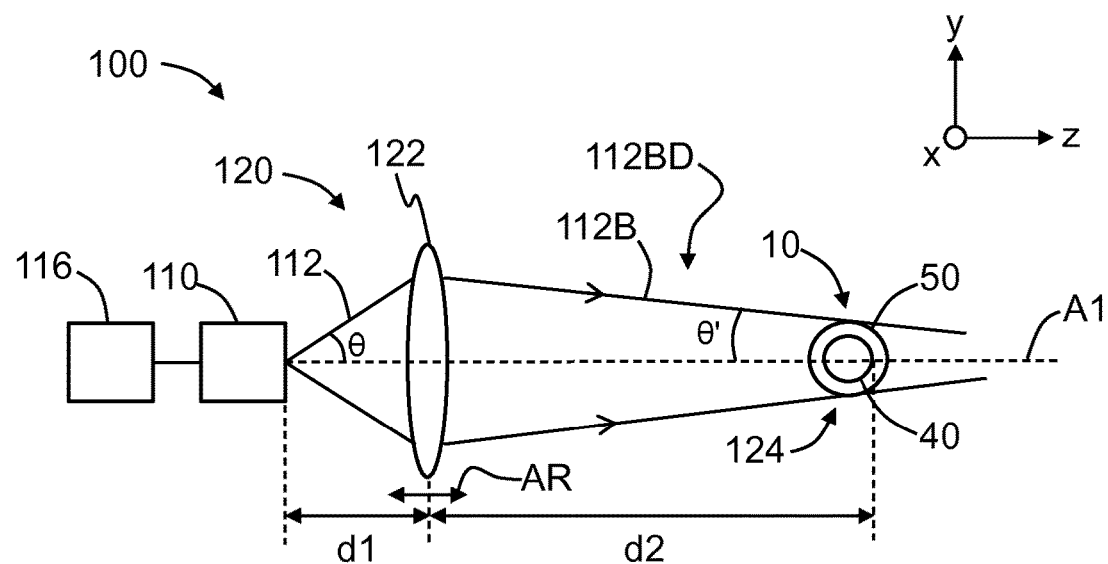
FIG. 4 is similar to FIG. 2B and shows the optical fiber being processed while the optical system is in a defocused configuration.

Once damaged coating portion 50D is formed, then with reference to FIG. 4, optical system 100 can be adjusted to have a "defocused configuration," wherein radiation beam 112B constitutes a defocused radiation beam 112BD that is less concentrated than focused radiation beam 112BF so that it irradiates the entire diameter dF of optical fiber 10. In an example, this adjustment of optical system 100 is accomplished by changing the distance d1 between radiation source 110 and focusing optical system 120. This change in distance d1 can be accomplished by axially moving focusing optical system 120, or at least one of the one or more optical elements 112 therein, or by moving radiation source 110. In an example, the defocused configuration is defined by optical fiber 10 no longer being within the depth of focus Δz. Also in an example, the intensity of defocused radiation beam 112BD at the location of optical fiber 10 is less than the optical-damage threshold intensity of coating 50.

Figure 5:
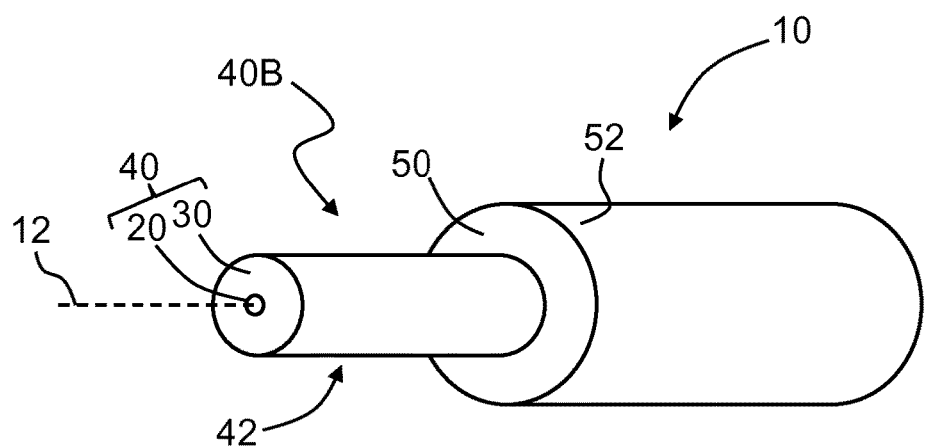
FIG. 5 is similar to FIG. 1 and shows a portion of the coating stripped from the optical fiber and the resulting stripped-fiber section or bare-fiber section.

The damaged coating portion 50D has an increased absorption at the operating wavelength λ of radiation 112. This causes a rapid increase in temperature upon continued irradiation, which leads to the burning and decomposition of the material of coating 50. In an example, focused laser beam 112BF of the focused configuration is used to form damaged coating portion 50D of a select size, and then defocused laser beam 112BD of the defocused configuration is scanned over the damaged coating portion to remove it from central glass portion 40 of optical fiber 10. This exposes a bare section or stripped section 42, as shown in FIG. 5. In an example, multiple scan passes of radiation beam 112B (in either the focused or defocused form 112BF or 112BD) can be used to remove any residual material of coating 50.

In an example, the stripping process can include adjusting optical system 100 back and forth between the focused and defocused configurations, and moving radiation beam 112B for each of these configurations relative to coating 50 as needed to carry out the stripping operation.

In another example, optical system 100 is operated only in the defocused configuration with a longer dwell time of defocused radiation beam 112BD on coating 50 to define damaged coating portion 50D, after which scanning of the (defocused) radiation beam relative to optical fiber 10 to remove the damaged portion of the coating is initiated.

Figure 6A:
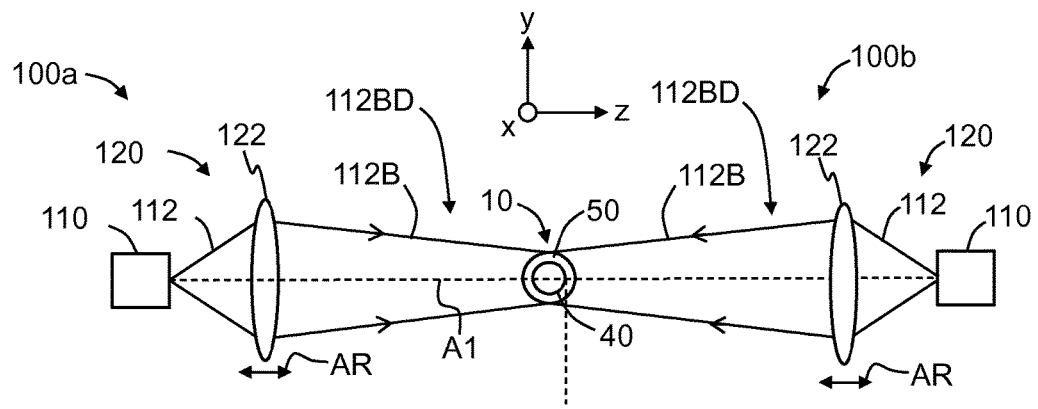
FIGS. 6A through 6D are schematic diagrams that illustrate example optical system configurations for performing the non-contact stripping methods disclosed herein.
Figure 6B:
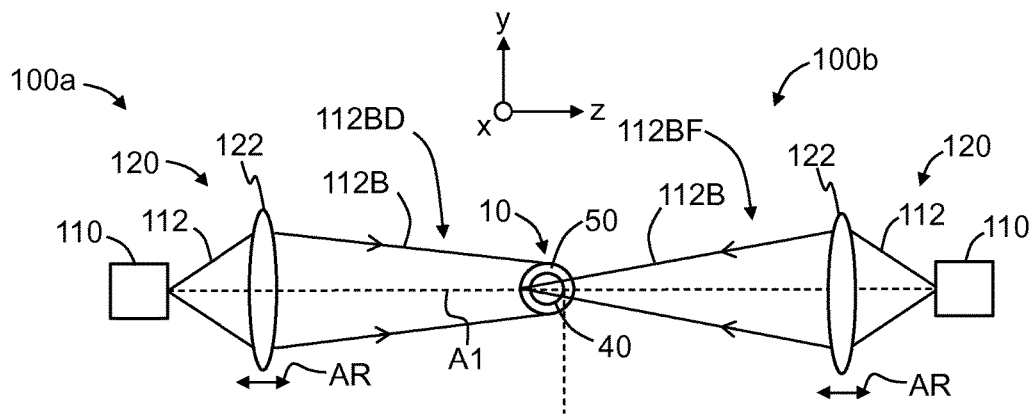
Figure 6C:
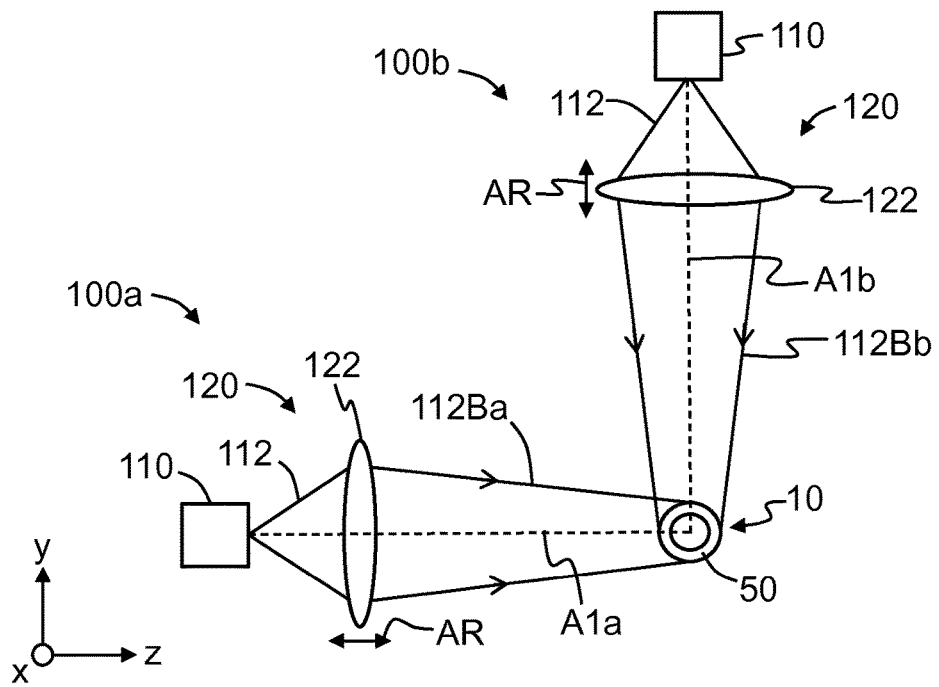

FIGS. 6A and 6B illustrate example embodiments wherein coating 50 of optical fiber 10 is irradiated by multiple (e.g., two) optical systems 100, denoted 100a and 100b. In FIG. 6A, the two optical systems 100a and 100b are shown in the defocused configuration. In FIG. 6B, optical system 100a is in the defocused configuration, while optical system 100b is in the focused configuration. In the example of FIG. 6B, optical system 100b is used to provide the higher intensity of radiation 112 at coating 50 to more quickly form damaged coating portion 50D in the coating, while optical system 100a provides the lower intensity but greater spatial coverage to remove the damaged coating portion. FIG. 6C is similar to FIG. 6B and shows the two optical systems 100a and 100b having respective optical axes A1a and A1b, which are arranged so that optical fiber 10 is irradiated by the respective radiation beams 112Ba and 112Bb at a right angle to each other.

Figure 6D:
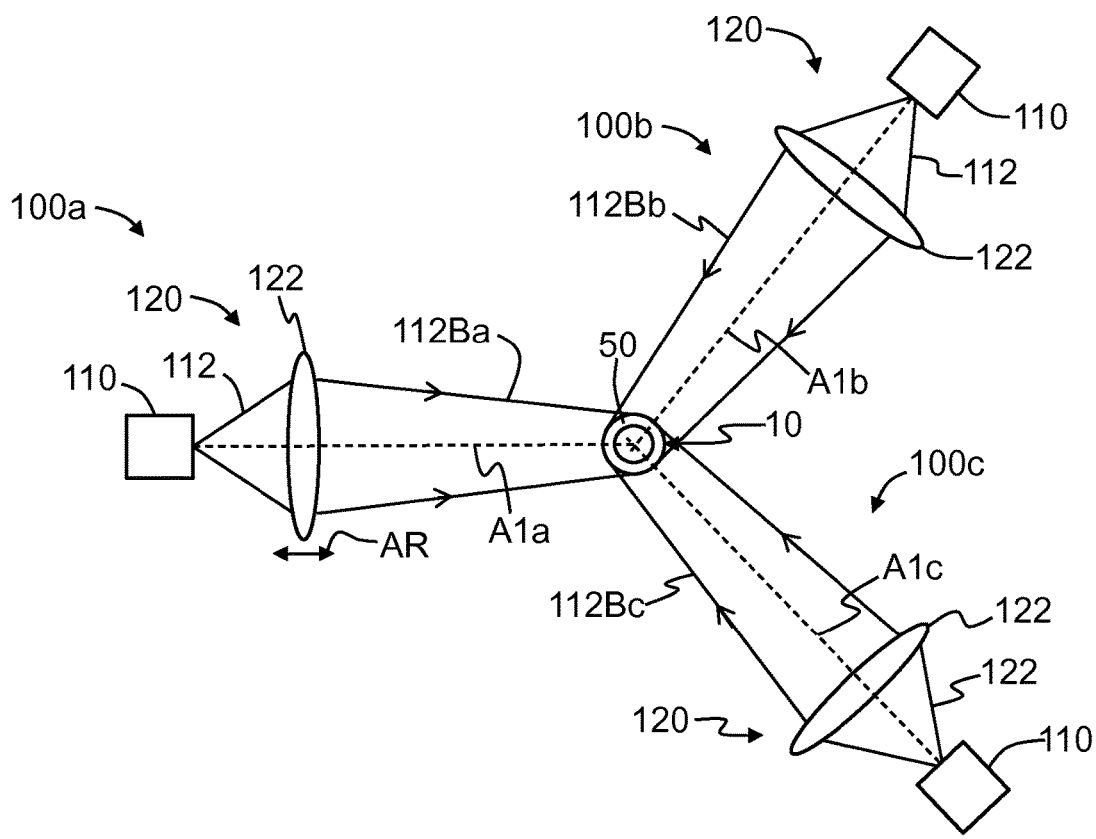

In other embodiments, the two or more optical systems 100 can also be arranged so that their respective optical axes define convenient irradiation angles. FIG. 6D illustrates an example that utilizes three optical systems 100, denoted 100a, 100b and 100c, with the three optical systems having respective optical axes A1a, A1b, A1c and respective radiation beams 112Ba, 112Bb and 112Bc. The optical axes A1a, A1b and A1c are arranged about 120 degrees apart and intersect substantially at optical fiber 10. In other embodiments using multiple optical systems 100, the angular separations of the optical systems need not be the same.

In an example, one or more of the multiple optical systems 100 can operated so that focused radiation beam 112BF is scanned over a portion of optical fiber 10 as discussed above to define damaged coating portion 50D and then to define the exposed central glass portion 40 of the optical fiber as bare section or stripped section 42, as shown in FIG. 5.

Figure 7:
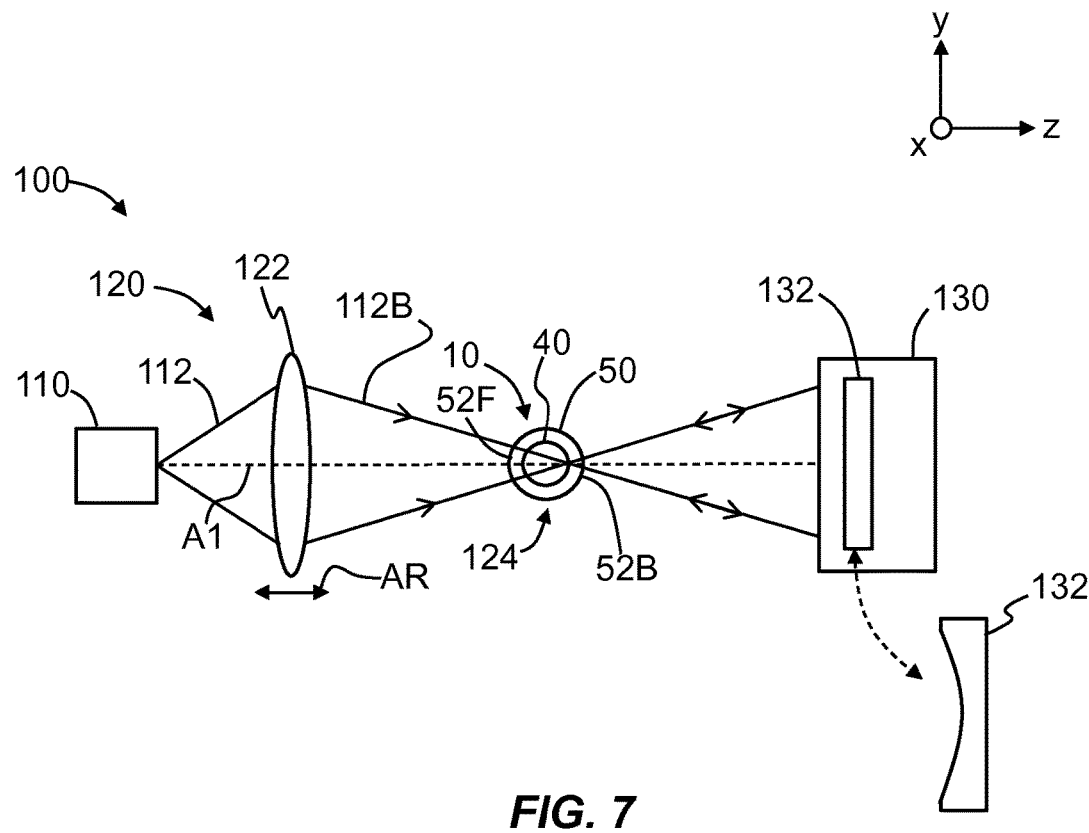
FIG. 7 is similar to FIG. 4 and illustrates an embodiment of the optical system that includes a radiation-recycling optical system adjacent the back side of the optical fiber surface and configured to receive radiation that passes through or around the coating and direct it back to the coating.

FIG. 7 illustrates another example that shows a single optical system 100 as described above and that further includes a radiation-recycling optical system 130 that includes one or more optical elements 132. The radiation-recycling optical system 130 is arranged on the opposite side of optical fiber 10 to focusing optical system 120, i.e., adjacent back side 52B of outer surface 52 of coating 50. The radiation-recycling optical system 130 is configured to receive radiation 112 from radiation beam 112B that passes through or around optical fiber 10 and direct the radiation back to coating 50.

In an example, the one or more optical elements 132 of radiation-recycling optical system 130 includes a converging mirror, such as a curved mirror or a retro-reflecting mirror (e.g., a retro-reflecting cube). Configurations that employ radiation-recycling optical system 130 make efficient use of radiation 112 emitted from radiation source 110. In an example, at least one of the optical systems 100 in a multi-optical-system configuration uses radiation-recycling optical system 130, while in another example, each of the optical systems in a multi-optical-system configuration includes its own radiation-recycling optical system.

Figure 8A:
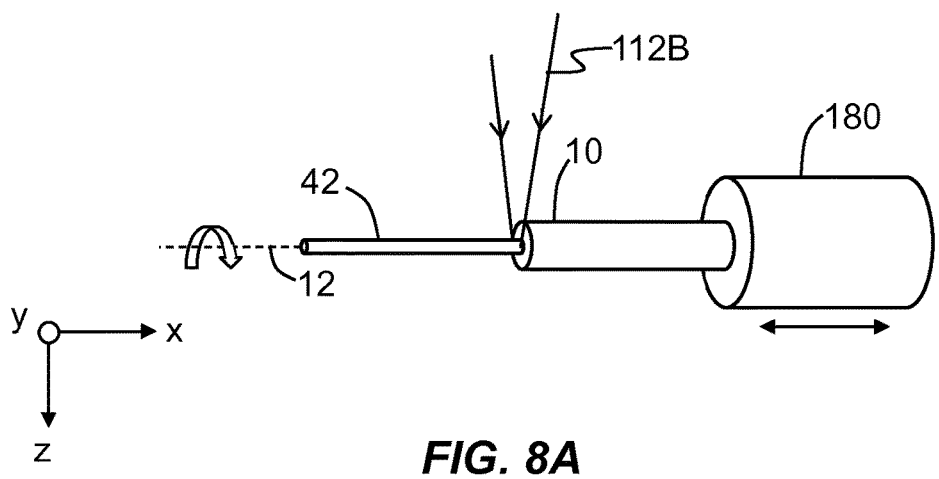
FIG. 8A is a front elevated view of an example optical fiber holder used to hold the optical fiber and also to rotate and translate the optical fiber.
Figure 8B:
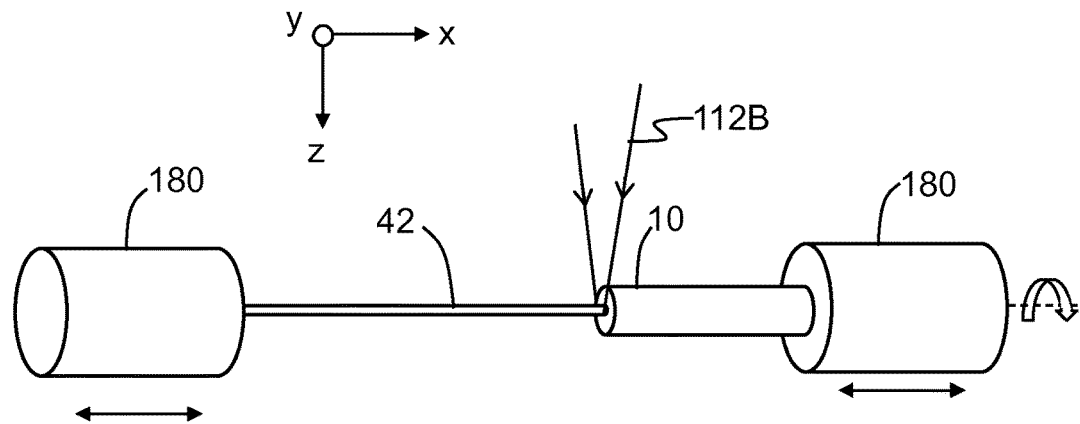
FIG. 8B is similar to FIG. 8A and illustrates an example embodiment where the optical fiber holder is configured to hold the optical fiber under tension.

FIG. 8A illustrates an embodiment wherein optical fiber 10 is held by an optical fiber holder 180. In an example, the optical fiber holder 180 is configured to rotate optical fiber 10 about its centerline 12, and can also optionally axially translate the optical fiber, i.e., along the optical fiber centerline. This allows for radiation beam 112B to irradiate different portions of coating 50 about the circumference of outer surface 52 for a given x-position, as well as to irradiate different portions of the coating along the length of the optical fiber (i.e., the x-direction). FIG. 8B is similar to FIG. 8A and illustrates an example wherein optical fiber 10 is held at both ends by optical fiber holder 180 to provide a degree of axial tension.

In an example, coating 50 is processed in a clean condition. In another example, coating 50 can be provided with at least one material that decreases the damage threshold of the coating or that otherwise facilitates the removal of the coating when the coating is irradiated by radiation beam 112B. In an example, the material provided to coating 50 can be what is normally considered a contaminant, such as oil, dirt, debris, etc., that increases the absorption of radiation 112. In an example, the contaminants can be provided simply by way of a person touching coating 50 with his or her hands.

Figure 9:
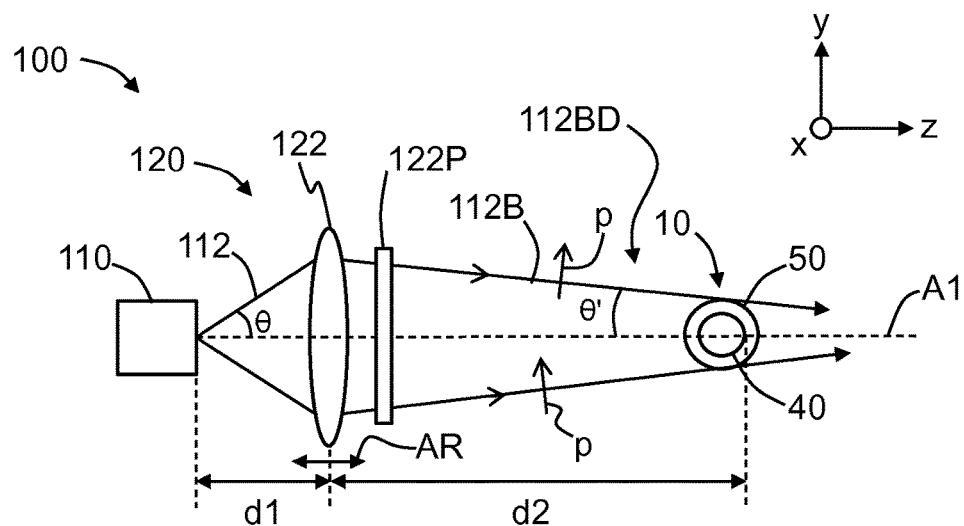
FIG. 9 is similar to FIG. 4 and illustrates an example embodiment wherein the optical system includes a polarizer to define a p-polarized radiation beam.

In an example embodiment illustrated in FIG. 9, one of the optical elements 122 of focusing optical system 120 is or includes a polarizer 122P that defines a polarization p for radiation beam 112B. In an example, polarization p is the p-polarization, which is perpendicular to the length (x-direction) of optical fiber 10 to optimize transmission of radiation 112 into coating 50.

Figure 10A:
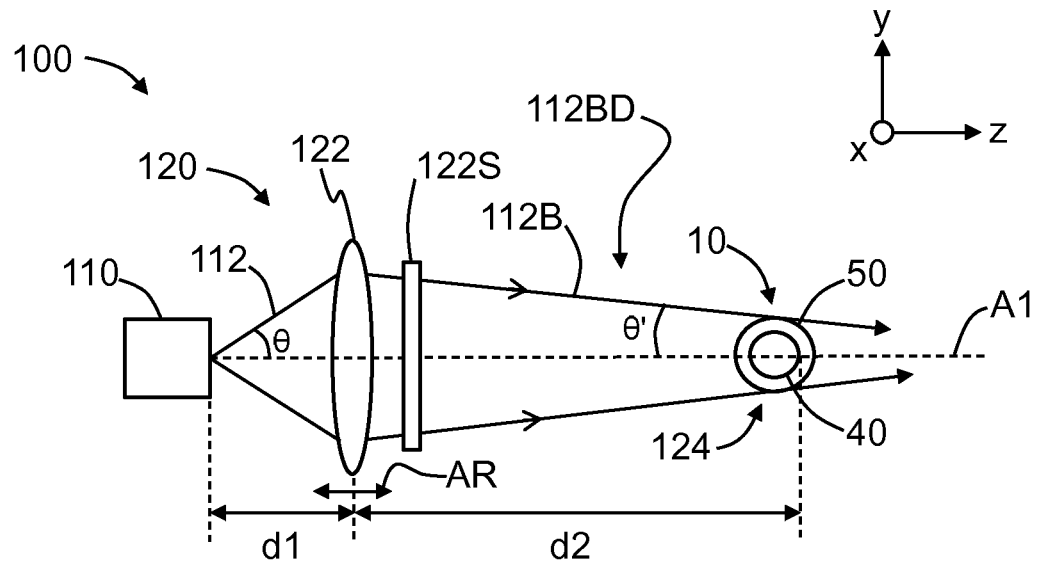
FIGS. 10A and 10B are schematic diagrams of an example optical system that includes a scanning element for scanning the radiation beam along the length of the optical fiber as well as laterally across the optical fiber.
Figure 10B:
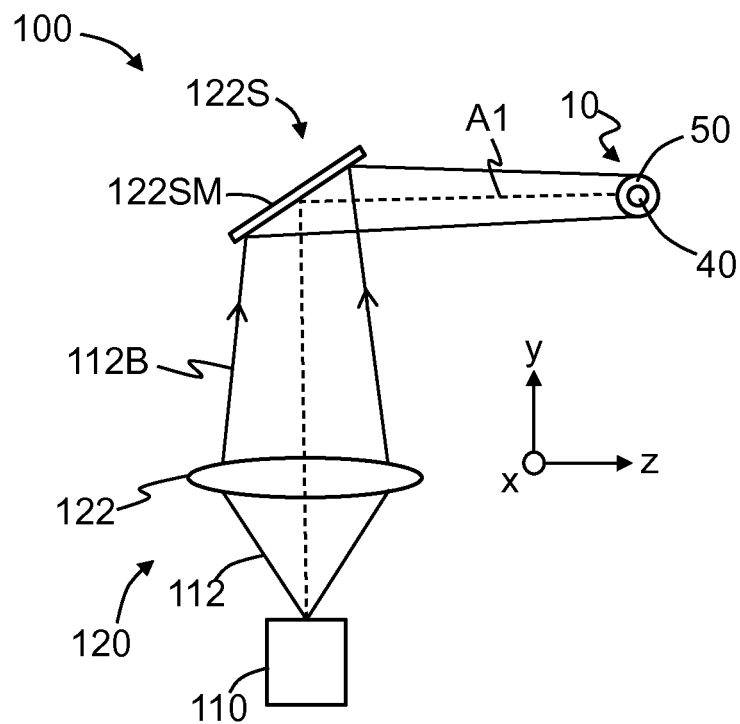

In another example illustrated in FIGS. 10A and 10B, one of the optical elements 122 of focusing optical system 120 is or includes a scanning element 122S that allows for radiation beam 112B to scan over coating 50. FIG. 10B shows an example scanning element 122S in the form of a scanning mirror 122SM that is configured to direct radiation beam 112B in the x-direction, i.e., to scan the radiation beam along a select length of optical fiber 10 (e.g., by rotation of the scanning element about the y-axis). The scanning element 122S can also be optionally scanned in the y-direction (e.g., by rotation of the scanning element about the x-axis) in the case wherein radiation beam 112B is a tightly focused radiation beam 112BF and does not cover the entire diameter of outer surface 52 of coating 50 in the lateral direction (i.e., the y-direction). The embodiment of optical system 100 of FIGS. 10A and 10B can be used in combination with moving optical fiber 10, i.e., performing at least one of axial translation and a rotation of the optical fiber using, for example, optical fiber holders 180 of FIGS. 8A and 8B.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of stripping a coating from an optical fiber, wherein the coating has an optical-damage threshold and surrounds a central glass portion of the optical fiber, comprising:
a) irradiating a portion of the coating with at least one beam of radiation having a wavelength at which the coating is substantially transparent and an intensity that exceeds the optical-damage threshold of the coating to form a damaged coating portion that absorbs radiation at the wavelength of the at least one beam of radiation, wherein the at least one beam of radiation is defocused after forming the damaged coating portion; and
b) irradiating the damaged coating portion with the at least one beam of radiation, after the at least one beam of radiation has been defocused, to cause the damaged coating portion to absorb a portion of the radiation and to heat up and disintegrate to expose a section of the central glass portion.

2. The method according to claim 1, wherein the at least one beam of radiation is emitted from a blue-violet diode laser at the wavelength of 405 nm.

3. The method according to claim 1, wherein the at least one beam of radiation has a wavelength of 445 nm.

4. The method according to claim 1, including moving the optical fiber during the irradiation that forms the damaged coating portion.

5. The method according to claim 1, wherein the irradiating that forms the damaged coating portion has a first intensity, the irradiating that exposes a section of the central glass portion has a second intensity, and the second intensity is less than the first intensity.

6. The method according to claim 5, wherein the second intensity is less than the optical-damage threshold.

7. The method according to claim 1, wherein the at least one beam of radiation comprises multiple beams of radiation that are incident upon the coating from different directions.

8. The method according to claim 1, wherein the at least one radiation beam has a p-polarization.

9. The method according to claim 1, wherein the at least one radiation beam is scanned along the length of the optical fiber for at least one of the irradiating acts a) and b).

10. The method according to claim 1, including receiving at least a portion of the at least one radiation beam that passes around or through the optical fiber and redirecting it to the coating.

11. The method according to claim 1, wherein the optical-damage threshold is 2 MW/cm$^2$ or less.

12. The method according to claim 1, wherein the wavelength is in the range from 400 nm to 460 nm.

13. A method of processing an optical fiber having a central glass portion defined by a core and a cladding and a coating surrounding the central glass portion that is transparent to a processing wavelength and that has an optical-damage threshold intensity at the processing wavelength, comprising:
   a) irradiating a portion of the coating with at least one first radiation beam having the processing wavelength, wherein the processing wavelength is either 405 nm or 445 nm, and having an intensity greater than the optical-damage threshold intensity to create a damaged coating portion; and
   b) irradiating the damaged coating portion with at least one second radiation beam having the processing wavelength of either 405 nm or 445 nm and an intensity that is less than the optical-damage threshold intensity;
   wherein the method further includes forming the at least one second radiation beam from the at least one first radiation beam by defocusing the at least one first radiation beam.

14. The method according to claim 13, wherein the optical-damage threshold intensity is 2 MW/cm$^2$ or less.

15. The method according to claim 13, including moving the optical fiber during the irradiation that forms the damaged coating portion.

16. The method according to claim 13, wherein the at least one first radiation beam comprises multiple first radiation beams that are incident upon the coating from different directions.

17. The method according to claim 13, wherein the at least one radiation beam has a p-polarization.

18. The method according to claim 13, wherein one or both of the at least one first radiation beam and the at least one second radiation beam is scanned along the length of the optical fiber.

19. The method according to claim 13, including receiving at least a portion of the at least one first radiation beam that passes around or through the optical fiber and redirecting it to the coating.

20. A method of processing an optical fiber, comprising:
   a) movably holding the optical fiber, wherein the optical fiber has a central glass portion defined by a core and a cladding and a coating surrounding the central glass portion and having a diameter, the coating being substantially transparent to a processing wavelength and having an optical-damage threshold intensity at the processing wavelength;
   b) forming at least one first focused radiation beam having the processing wavelength, a depth of focus, and a spot size that is less than the diameter of the coating within the depth of focus, and an intensity greater than the optical-damage threshold within at least a portion of the depth of focus;
   c) arranging the optical fiber within the depth of focus and irradiating a portion of the coating with the at least one focused radiation beam to create a damaged coating portion;
   d) defocusing the at least one focused radiation beam to define at least one defocused radiation beam having an intensity that is less than the optical-damage threshold intensity; and
   e) irradiating the damaged coating portion with the at least one defocused radiation beam that irradiates the entire diameter of the coating.

21. The method according to claim 20, wherein the processing wavelength is in the range from 400 nm to 460 nm.

22. The method according to claim 20, including moving the optical fiber while performing acts c) and e).

23. The method according to claim 22, wherein moving the optical fiber includes at least one of rotating the optical fiber and axially translating the optical fiber.

24. The method according to claim 20, wherein the optical-damage threshold intensity is 2 MW/cm$^2$ or less.

* * * * *